(12) United States Patent
Berne et al.

(10) Patent No.: US 10,793,055 B1
(45) Date of Patent: Oct. 6, 2020

(54) VEHICLE COMPRISING A WIND DEFLECTING ASSEMBLY AND A LIGHTING DEVICE

(71) Applicant: Volvo Truck Corporation, Gothenburg (SE)

(72) Inventors: Nicolas Berne, Heyrieux (FR); Olivier Hermann, Saint Maurice sur Dargoire (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/827,107

(22) Filed: Mar. 23, 2020

(30) Foreign Application Priority Data

Mar. 25, 2019 (FR) ..................................... 19 03089

(51) Int. Cl.
| | | |
|---|---|---|
| *B60Q 1/00* | (2006.01) | |
| *B60Q 1/32* | (2006.01) | |
| *B62D 35/00* | (2006.01) | |
| *B62D 37/02* | (2006.01) | |

(52) U.S. Cl.
CPC .............. *B60Q 1/0023* (2013.01); *B60Q 1/32* (2013.01); *B62D 35/008* (2013.01); *B62D 37/02* (2013.01)

(58) Field of Classification Search
CPC ........ B60Q 1/0023; B60Q 1/32; B62D 37/02; B62D 35/008; B62D 35/001
See application file for complete search history.

(56) References Cited

U.S. PATENT DOCUMENTS

| | | | |
|---|---|---|---|
| 7,455,348 B1* | 11/2008 | Grover ................. | B62D 35/001 |
| | | | 296/180.1 |
| 2006/0203091 A1 | 9/2006 | Eggers et al. | |
| 2012/0062741 A1 | 3/2012 | Stimel, Jr. et al. | |
| 2018/0324367 A1 | 11/2018 | Siddiqui et al. | |

FOREIGN PATENT DOCUMENTS

| | | | | |
|---|---|---|---|---|
| CN | 206756149 U | * | 12/2017 | |
| CN | 109109743 A | | 1/2019 | |
| DE | 29818214 U1 | | 2/2000 | |
| WO | 2017/134121 A1 | | 8/2017 | |
| WO | 2017/178859 A1 | | 10/2017 | |
| WO | WO-2018132384 A1 | * | 7/2018 | ........... B60Q 1/2661 |
| WO | WO-2019086920 A1 | * | 5/2019 | ............... B60R 1/12 |

OTHER PUBLICATIONS

Preliminary search report for FR 1903089 dated Oct. 22, 2019, 2 pages.

* cited by examiner

*Primary Examiner* — Mariceli Santiago
(74) *Attorney, Agent, or Firm* — Withrow & Terranova, PLLC

(57) ABSTRACT

A vehicle comprises a chassis and a cab mounted on the chassis and including two side walls. The vehicle further comprises two side deflector panels, each having a front edge linked to a rear portion of the corresponding side wall of the cab and a rear edge, and extending vertically over at least one portion of the height of the rear portion of the corresponding side wall of the cab. A camera monitoring system, which includes a camera arranged on a supporting arm, is mounted on the cab to provide a captured image of an area located rearward of the cab. A lighting device is mounted on a side deflector panel and includes at least one infrared (IR) emitting light source.

10 Claims, 3 Drawing Sheets

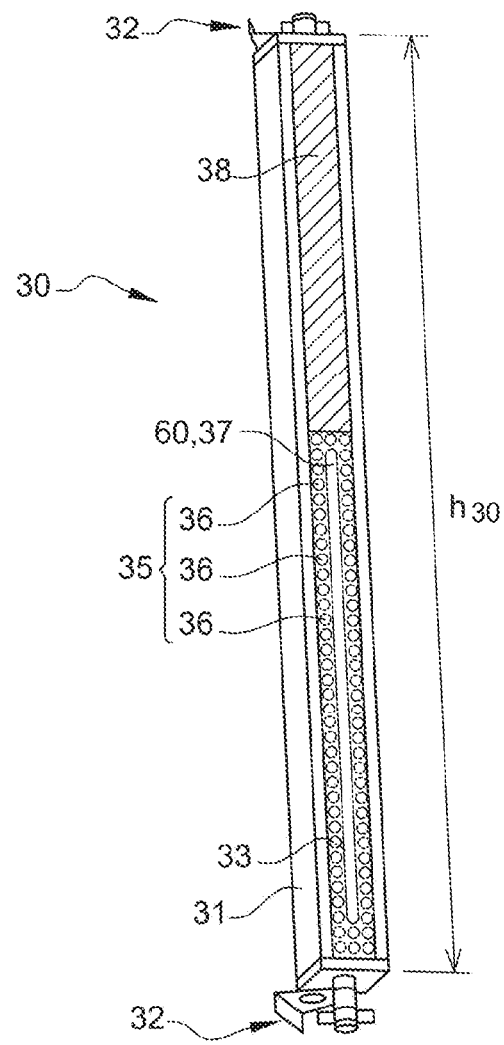
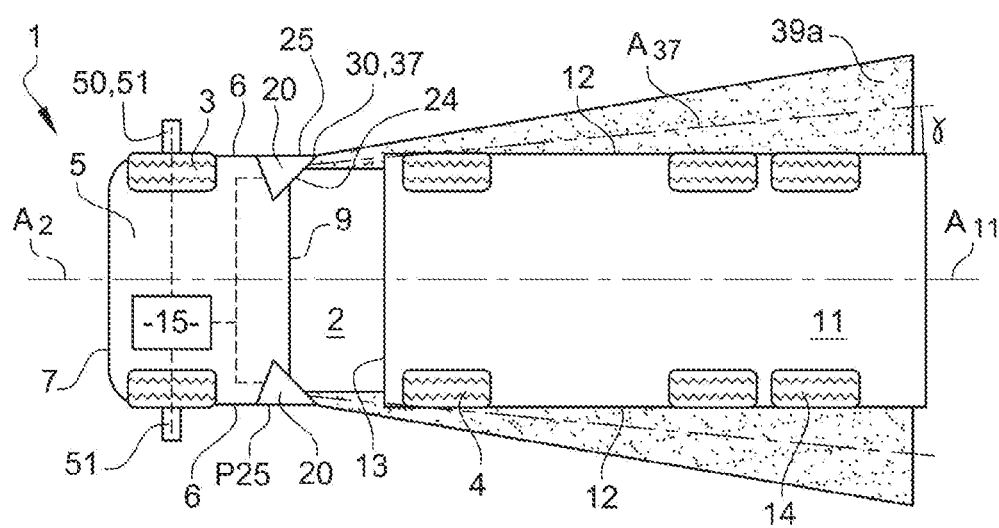

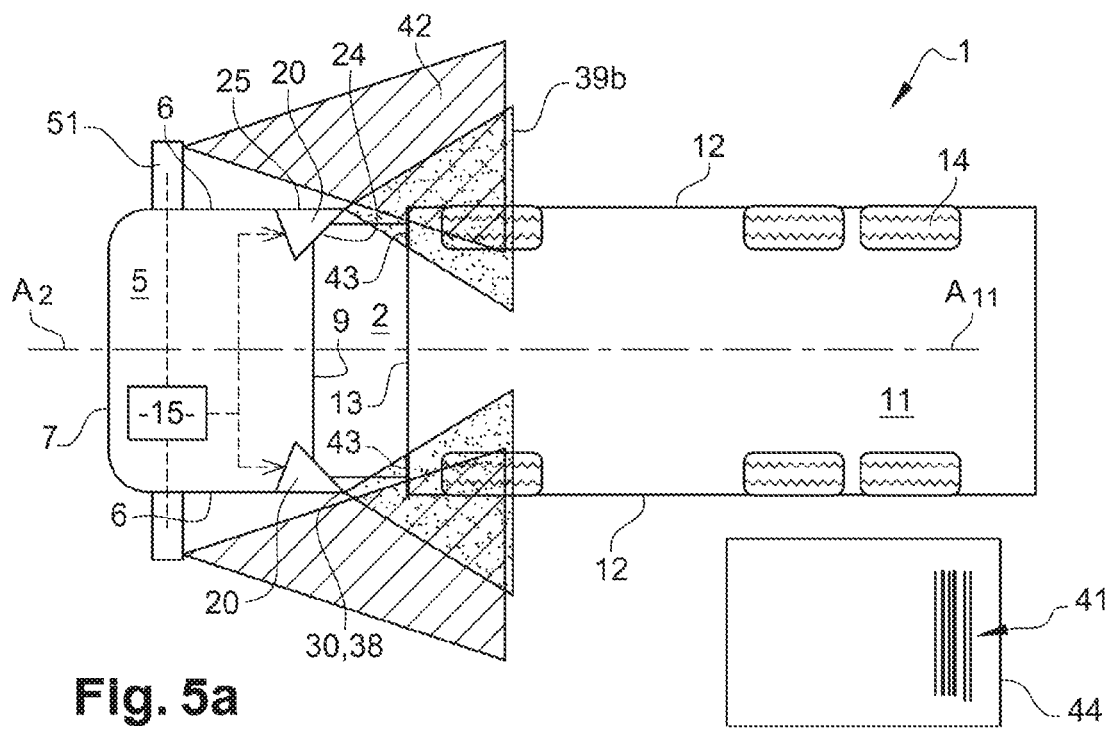
Fig. 5a
Fig. 5b
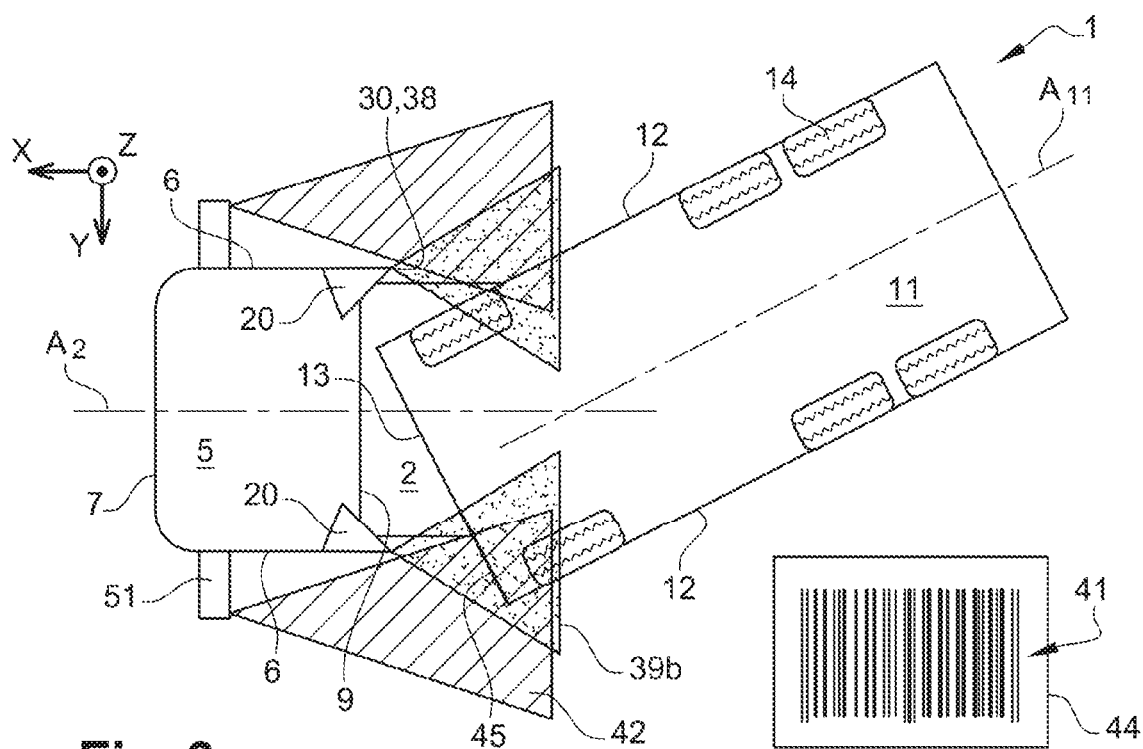
Fig. 6a
Fig. 6b

VEHICLE COMPRISING A WIND DEFLECTING ASSEMBLY AND A LIGHTING DEVICE

This application claims priority to French patent application 19/03089, filed Mar. 25, 2019, the disclosure of which is incorporated herein by reference in its entirety.

TECHNICAL FIELD

The present disclosure concerns a vehicle comprising a lighting device and to a method for controlling a lighting device in such a vehicle.

The present disclosure is used in vehicles including a cab and a trailer which is connected or which can be connected to the cab, in particular in heavy-duty vehicles, such as trucks.

BACKGROUND

One of the evolutions of the industrial vehicles consists in replacing the conventional rear-view mirrors with a camera monitoring system. Such a system comprises a camera arranged on a supporting arm mounted on the cab, and a camera mounted on this supporting arm, arranged to provide a captured image of an area located rearward of the cab, and generally along of the vehicle. An image, obtained after processing the captured image, can then be displayed on a screen located inside the cab.

The camera monitoring system should be designed to provide the driver of the vehicle with an image displayed on the screen which guarantees a good visibility, that is to say which ultimately guarantees the safety of people in the environment of the vehicle, as well as the integrity of the vehicle and the surrounding objects.

For this purpose, there are different systems which allow improving the displayed image, in terms of framing, quality, etc. However, some situations are not taken into account in a fully satisfactory manner.

SUMMARY

The present disclosure aims at overcoming all or part of the drawbacks of the related art, by providing a vehicle equipped with a camera monitoring system allowing improving the image displayed for the driver.

For this purpose, and according to a first aspect, the present disclosure concerns a vehicle comprising:
  a chassis which has a longitudinal axis and which is supported by wheels;
  a cab mounted on the chassis, the cab including two side walls;
  a wind deflecting assembly comprising at least two side deflector panels, each side deflector panel having a front edge linked to a rear portion of the corresponding side wall of the cab and a rear edge, and extending vertically over at least part of the height of the rear portion of the corresponding side wall of the cab;
  a camera monitoring system, which includes a camera arranged on a supporting arm mounted on the cab, to provide a captured image of an area located rearward of the cab;
  and, further, at least one lighting device which is mounted on a side deflector panel and which includes at least one IR emitting light source.

The use of one or several IR emitting light source(s), which may be LEDs, allows improving the performance of the camera monitoring system in night conditions, or more generally when the ambient brightness is too low. This results in a higher quality of the image captured by the camera, and therefore of the image displayed on the screen for the driver, in particular in terms of details and contrasts. Safety is therefore considerably improved.

In addition, mounting the IR emitting light source on a side deflector panel brings significant advantages.

Being mounted on the side deflector panel, these light sources protrude relative to the cab outer surface, which allows the emitted beam to cover a fairly broad area. However, with such a mounting, these sources and the lighting device, although disposed protruding relative to the cab, are mechanically protected against damages caused by the surrounding elements. The arrangement according to the present disclosure is therefore particularly satisfactory in terms of robustness and reliability.

Furthermore, the position of the side deflector panels is such that substantially no vehicle component is located on the path of the emitted beam between the source and the target area, thereby eliminating the creation of dark areas.

Such an arrangement further allows taking advantage of a component which is already existing on the vehicle, namely the side deflector panels, which offers a cost effective and mechanically simplified solution.

In practice, the lighting device may comprise a casing which includes a fastening system for being mounted on the side deflector panel, and which has an open rear face. A glass can be mounted on the casing for closing the open rear face of the casing. The casing and the glass thus form a housing which receives light sources that emit a beam rearward through the glass. The light sources are at least of the IR emitting type, the lighting device may possibly offer other illuminating functions.

The vehicle may comprise a lighting device on each side deflector panel, the left and right lighting devices being preferably identical.

When the vehicle is running, the outer face of each side deflector panel can typically be substantially in the same plane as the corresponding cab side wall, that is to say the side deflector panel outer face defines a mean plane which is substantially vertical and longitudinal or angled slightly outwardly from the side deflector panel front edge to its rear edge, by an angle less than 10°.

The vehicle can be a tractor only, when no trailer is connected to the chassis, or can comprise both a tractor and a trailer connected to the chassis.

According to one possible embodiment, the lighting device extends over a height which is at least equal to half the height of the side deflector panel, preferably substantially identical to the height of the side deflector panel. The lighting device can extend over the entire height of the rear portion of the corresponding cab side wall, and even further upwards, for example if the wind deflecting assembly further comprises a top deflector panel arranged on the cab roof.

For example, the lighting device includes an area including several IR emitting light sources, said area being capable of extending over a height which is at least equal to half the height of the side deflector panel. This area can extend over the entire height of the lighting device, or only part of it.

In one embodiment, each side deflector panel has an inner face, disposed towards the longitudinal axis of the chassis, and an outer face, and the lighting device is mounted on the inner face of the side deflector panel.

The lighting device can be mounted near the rear edge of the side deflector panel.

The side deflector panel can occupy a position in which the outer face thereof is substantially in the extension of the corresponding side wall of the cab. This position is an aerodynamic position. The side deflector panel is preferably in this position when the vehicle is running. The term «substantially in the extension of the corresponding side wall of the cab» means that the outer face of the side deflector panel defines a mean plane which is substantially vertical and longitudinal, and preferably substantially coincident with the plane defined by the corresponding side wall of the cab, or angled slightly outwardly from its front edge to its rear edge, by an angle less than 10°.

According to a possible embodiment, the lighting device is configured and mounted on the side deflector panel such that, when the side deflector panel is in this aerodynamic position, the at least one IR emitting light source can emit a light beam substantially along a corresponding side wall of the chassis.

The term "along" means that the light beam includes an area rearward of the cab, including the side wall of the chassis and nearby side areas.

The lighting device can be configured and mounted on the side deflector panel such that, when the side deflector panel is in this aerodynamic position, a main optical axis of the at least one IR emitting light source, when projected on a horizontal plane, is angled relative to the longitudinal axis of the chassis by an angle ($\gamma$) which is comprised between $-10°$ and $+10°$, preferably between $-5°$ and $+5°$.

Optionally, provision may be made for the side deflector panel to be pivotally mounted relative to the corresponding side wall of the cab, about a pivot axis which substantially coincides with the front edge of the side deflector panel, between:
  a first position, which is the aforementioned aerodynamic position; and
  a second position, in which the outer face of the side deflector panel defines a mean plane which is substantially vertical and angled outwardly from the front edge of the side deflector panel to the rear thereof.

When in the second position, the side deflector panels protrude outwardly from the cab outer envelope. Consequently, this second position is preferably not used when the vehicle is running, but rather when the vehicle is stopped, for various operations. For example, said mean plane defined by the outer face of the side deflector panel can form with the vertical longitudinal plane an angle of at least 40°, preferably at least 60°, and more preferably at least 90°.

The lighting device can further include at least one working lamp configured to illuminate an area located rearward of the cab.

The term "working lamp" means a lamp comprising one or several light source(s) having a high intensity in the visible spectrum, like a projector. Such a working lamp has an illuminating function, not only a signaling function—for example a regulatory function—for informing or warning a person outside the vehicle. The light sources can be LEDs.

The working lamp can be configured to emit a light beam providing at least 2 lux, preferably at least 4 lux, in the target area. In one embodiment, the working lamp can be configured to emit a light beam providing more than 5 lux and less than 10 lux, in the target area. In an area illuminated by two distinct working lamps having overlapping beams, the received luminous flux may then be above 10 lux. The light emission level may vary depending on the design of the lighting device (presence or absence of a reflector, number of lighting sources, emission specifications of the lighting sources, position of the lighting sources, etc.).

Alternatively, or in addition, the lighting device may include at least one light source configured to project an image rearward of the cab, the image forming a mark on a functional face located rearward of the cab, said mark being detectable by the camera. The functional face can be at least part of a front face of a trailer pivotally linked to the chassis; the mark can typically be representative of an angle between the longitudinal axis of the trailer and the longitudinal axis of the chassis. This allows determining the angle of the trailer relative to the longitudinal axis of the chassis. In particular, in a possible embodiment, the marks are vertical lines—or other visual elements—the number of which can be determined by the camera monitoring system, thus allowing determining said angle.

Alternatively, or in addition, the lighting device can include at least one light source having a signaling function.

According to a second aspect, the present disclosure relates to a method for controlling a lighting device in a vehicle as previously described, in which the lighting device includes, in addition to at least one IR emitting light source, at least one additional light source among a working lamp and light source(s) used to form a camera detectable mark on a functional face located rearward of the cab. The method comprises the steps consisting in:
  determining at least one selection parameter among:
    a configuration of the vehicle, for example if a trailer is connected to the chassis or not;
    an operating condition of the vehicle, for example if the vehicle is running or stopped, in a trailer loading/unloading phase or not;
    a surrounding condition, such as the ambient light;
  depending on said determined selection parameter, activating automatically or through manual control at least one among the IR emitting light source(s) and the at least one additional light source.

BRIEF DESCRIPTION OF THE FIGURES

Several possible embodiments of the present disclosure are now described, by way of non-limiting examples, with reference to the appended figures:

FIG. 3 is a perspective view of a lighting device according to an embodiment of the present disclosure;

FIG. 4 is a schematic top view of a vehicle according to an embodiment of the present disclosure;

FIG. 5a is a schematic top view of a vehicle according to another embodiment of the present disclosure, the trailer of the vehicle being parallel to the longitudinal axis of the chassis;

FIG. 5b shows an image captured by a camera of the vehicle in the position of FIG. 5a;

FIG. 6a is a view similar to FIG. 5a, the trailer of the vehicle forming an angle relative to the longitudinal axis of the chassis;

FIG. 6b shows an image captured by a camera of the vehicle in the position of FIG. 6a.

DETAILED DESCRIPTION

Figure 1:
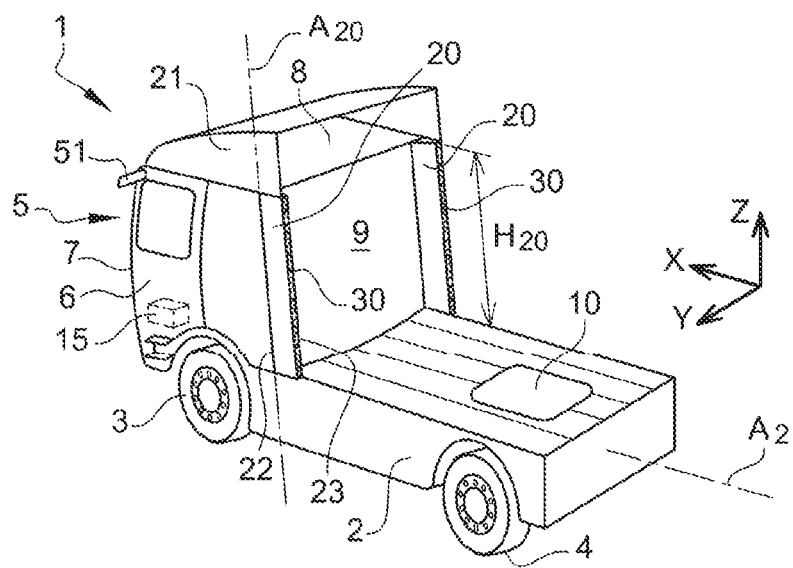
FIG. 1 is a perspective view of a vehicle comprising a wind deflecting assembly and a lighting device according to an embodiment of the present disclosure.
Figure 2:
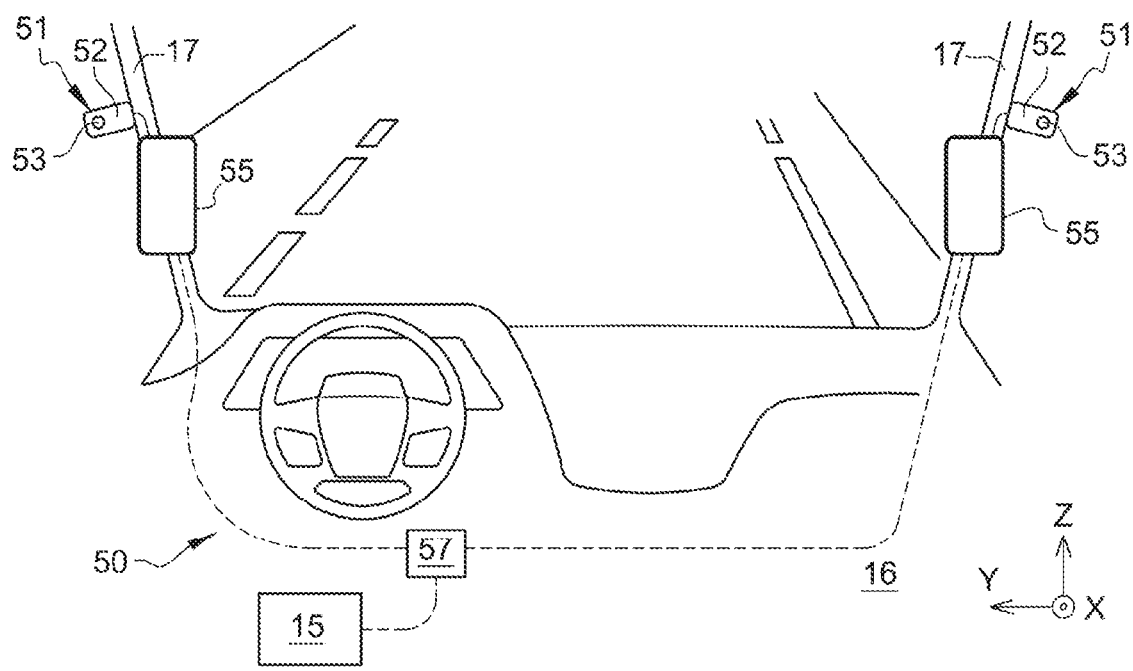
FIG. 2 is a schematic perspective view forward from inside the vehicle cab, showing a camera monitoring system.

A vehicle 1, as illustrated in FIG. 1, comprises a chassis 2 supported by wheels, namely front wheels 3 and rear wheels 4. A cab 5 defining a driver's compartment is mounted on the chassis 2, on the front. The cab 5 has two side walls 6, a front wall 7, a top wall 8 and a rear wall 9. The chassis 2 can further include a trailer connector 10 located rearward of the cab 5. The vehicle 1 can thus include a trailer 11 mechanically and electrically connected to the chassis 2 (as in FIG. 4 for example), or no trailer connected to the chassis 2, the vehicle 1 thus being only a tractor (as in FIG. 1). The trailer 11 has side walls 12 and a front wall 13. The trailer 11 further comprises rear wheels 14. The trailer 11 can be pivotally connected to the chassis 2.

Z is defined as the vertical direction, X is defined as the longitudinal direction of the vehicle 1 and Y is defined as the transverse direction of the vehicle 1. The chassis 2 has a longitudinal axis A2 and the trailer 11 has a longitudinal axis A11.

The vehicle 1 may comprise an electrical control unit (ECU) 15 for controlling the various electric systems of the vehicle 1.

The vehicle 1 also comprises a wind deflecting assembly for improving aerodynamics. The wind deflecting assembly comprises two side deflector panels 20, and can further comprise a top deflector panel 21 arranged on the top wall 8 of the cab 5.

Each side deflector panel 20 has a front edge 22 linked to a rear portion of the corresponding side wall 6 of the cab 5 and a rear edge 23, and extends vertically over a height H20, over at least part of the height of the rear portion of the corresponding side wall 6 of the cab 5. In the embodiment illustrated in FIG. 1 by way of example, the height H20 of the side deflector panel 20 is substantially identical to the height of the cab 5. In other embodiments, the side deflector panels 20 could extend further upwards beyond the top wall 8 of the cab 5. Each side deflector panel 20 has an inner face 24, disposed towards the longitudinal axis A2 of the chassis 2, and an outer face 25 along which air flows when the vehicle 1 is in motion.

Each side deflector panel 20 may be pivotally mounted relative to the corresponding side wall 6 of the cab 5, about a pivot axis A20 which is substantially coincident with the front edge 22 of the side deflector panel 20. Consequently, in this non-limiting embodiment, the side deflector panel 20 may pivot between:
 - a first position (illustrated in the Figures), or aerodynamic position, in which an outer face of the side deflector panel 25 is substantially in the same plane as the corresponding side wall 6 of the cab 5;
 - and a second position (not represented), in which the side deflector panel outer face 25 defines a mean plane P25 which is substantially vertical and angled outwardly from the front edge 22 of the side deflector panel 20 to the rear edge 23 thereof.

The vehicle 1 further comprises a camera monitoring system 50 (or CMS). The camera monitoring system 50 includes a camera device 51 mounted on the cab 5, preferably a left camera device 51 and a right camera device 51. The camera device 51 can typically be mounted on a front upper portion of the corresponding side wall 6 of the cab 5, for example above a door (FIG. 1).

The camera device 51 essentially comprises a supporting arm 52 mounted on the cab 5 and a camera 53 arranged on the supporting arm 52, to provide a captured image 44 of an area located rearward of the cab 5, and preferably along the corresponding side of the vehicle 1.

The supporting arm 52 can be fixedly mounted on the cab 5, and can be equipped with a mechanism (not represented) allowing the camera device 51 to be:
 - either in an inactive position (not represented in the Figures), when not in use (typically when the vehicle 1 is stopped), in which the camera device 51 is folded down along the corresponding side wall 6 of the cab 5, to prevent it from being damaged;
 - or in an active position, in which the camera device 51 protrudes from the corresponding side wall 6 of the cab 5, to allow the camera 53 to capture images (see FIG. 1 for example). In this active position, the camera 53 has a field of vision 42 (FIG. 5*a*).

The camera monitoring system 50 further comprises a screen 55 inside the passenger compartment 16, for displaying an image obtained from the captured image 44 provided by the camera 53. A left screen 55 and a right screen 55 can be provided, connected respectively to the left camera device 51 and to the right camera device 51. The screen can be mounted on a front pillar 17 of the cab 5, located between the front wall 7 and a side wall 6.

The camera monitoring system 50 also preferably comprises a control unit 57, which can be connected to the electrical control unit 15 of the vehicle 1.

The vehicle 1 also comprises at least one lighting device 30 which is mounted on a side deflector panel 20. The vehicle 1 may typically comprise two lighting assemblies 30, preferably identical, one lighting device 30 being mounted on each side deflector panel 20.

As shown in FIG. 3, the lighting device 30 can comprise a casing 31 which includes a fastening system 32 for being mounted on the side deflector panel 20 and which has an open rear face. A glass 33 can be mounted on the casing 31 for closing the open rear face of the casing 31. The casing 31 and the glass 33 thus form a housing which receives light sources that emit a beam rearward through the glass 33. All or some light sources can comprise LEDs. The lighting device 30 may include other components such as an optical deflector.

The lighting device 30 can be mounted on the inner face 24 of the side deflector panel 20. It can be mounted near the rear edge 23 of the side deflector panel 20.

The lighting device 30 includes one or several IR emitting light source(s) 37. The IR emitting light source(s) 37 has/have a main optical axis A37 and emit a light beam 39*a*.

The lighting device 30 may provide other illuminating functions. In particular, the lighting device 30 may also include:
 - at least one working lamp 35. The working lamp 35 comprises one or several light source(s) 36 having a high intensity in the visible spectrum, and is configured to illuminate an area located rearward of the cab 5;
 - and/or one or several light source(s) 38 used to form a mark on a functional face located rearward of the cab 5, as will be described later.

It should be noted that the arrangement of light sources 36, 37, 38 having various illuminating functions, as illustrated in FIG. 3, is only an embodiment given by way of example, and should not be considered as limiting.

The lighting device 30 has a height h30 that is at least 50%, preferably at least 70%, more preferably at least 80%, of the height H20 of the side deflector panel 20. In the embodiment illustrated by way of example in FIG. 1, the height h30 of the lighting device 30 is substantially identical to the height H20 of the side deflector panel 20.

As shown in FIG. 3, lighting device 30 includes an area 60 including several IR emitting light sources 37. This area 60 can extend over a height which is at least equal to half the height h30 of the lighting device 30, that is to say, in one embodiment, at least equal to half the height H20 of the side deflector panel 20.

Reference is now made to FIG. 4.

In this embodiment, the lighting device 30 is configured and mounted on the side deflector panel 20 such that, when the side deflector panel 20 is in the aforementioned aerodynamic position, the IR emitting light source(s) 37 can emit a light beam 39a substantially along a corresponding side wall of the chassis 2. In other words, in a horizontal plane (X, Y), the main optical axis A37 of the IR emitting light sources 37 is angled relative to the longitudinal axis A2 of the chassis 2 by an angle γ which is comprised between −10° and +10°, preferably between −5° and +5°.

The concepts disclosed herein thus allow improving the operation of the camera monitoring system 50 in night or dark conditions, specifically when the vehicle 1 is in motion. The captured image 44 and, ultimately, the image displayed on the driver's screen 55, are more contrasted and/or include more visible details, which allows improving safety.

When the lighting device 30 comprises a working lamp 35, said working lamp may be arranged so as to be able to emit a light beam substantially along a corresponding side wall of the chassis 2, either with the side deflector panel 25 in the aforementioned first position (aerodynamic position), or, if the side deflector panel 25 is pivotally mounted, with this side deflector panel 25 in the aforementioned second position. In other words, in a horizontal plane (X, Y), the working lamp main optical axis can be angled relative to the longitudinal axis A2 of the chassis 2 by an angle which is comprised between −10° and +10°, preferably between −5° and +5°.

This is particularly interesting on a stationary vehicle 1 having a trailer 11 connected to the chassis 2, in the case of loading/unloading the trailer 11 through a side aperture thereof, in a dark environment (in night conditions or in a place where ambient light is low). Indeed, the working lamp 35 illuminates the side walls 12 of the trailer 11 and therefore makes the loading/unloading easier and safer.

Reference is now made to FIGS. 5a to 6b.

According to this embodiment, the lighting device 30 includes one or several light source(s) 38 which is/are configured to emit a light beam 39b and to project an image forming a mark 41 on a functional face located rearward of the cab 5, with the side deflector panel 25 in the aforementioned first position (aerodynamic position). The functional face can be at least part of the front face 13 of the trailer 11, which can be a reflective surface. The mark 41 or its reflection is detectable by the camera. The mark 41 may consist of a set of vertical lines.

When the longitudinal axis A11 of the trailer 11 substantially coincides with the longitudinal axis A2 of the chassis 2, as shown in FIG. 5a, the field of vision 42 of each camera 53 includes a corresponding small side end portion 43 of the front face 13 of the trailer 11. Consequently, as shown in FIG. 5b, the captured image 44 which is captured by each camera 53 includes only a small portion of the mark 41.

When the vehicle 1 is turning, the longitudinal axis A11 of the trailer 11 is angled relative to the longitudinal axis A2 of the chassis 2, as shown in FIG. 6a. Then, the field of vision 42 of a camera 53 includes a corresponding side end portion 45 of the front face 13 of the trailer 11 that is wider than the small side end portion 43 of the straight configuration of FIG. 5a. Consequently, as shown in FIG. 6b, the captured image 44 which is captured by said camera 53 includes a larger portion of the mark 41.

This arrangement allows determining the angle between the longitudinal axis A11 of the trailer 11 and the longitudinal axis A2 of the chassis 2, for example by counting the lines in the captured image 44 by means of the camera monitoring system 50. This angle value can be used to improve several functions of the vehicle 1.

In practice, the lighting device 30 may include, in addition to at least one IR emitting light source 37, at least one additional light source among a working lamp 35 and light source(s) 38 used to form a mark 41 which is detectable by the camera 53 on a functional face located rearward of the cab 5. In this case, all light sources 36, 37, 38 are not necessarily activated at a given time, insofar as their functions are different.

The present disclosure therefore provides a method for controlling the lighting device 30 of the vehicle 1.

The method first comprises determining at least one selection parameter among:

P1: a configuration of the vehicle 1, for example if a trailer 11 is connected to the chassis 2 or not;

P2: an operating condition of the vehicle 1, for example if the vehicle 1 is running or stopped, in a trailer loading/unloading phase or not;

P3: a surrounding condition, such as the ambient light (night conditions or day conditions, brightness).

Then, depending on said determined selection parameter P1, P2, P3, the method comprises activating at least one of the light source(s) 36, 37, 38. This activation may be automatically controlled by the electrical control unit 15 or manually controlled through a control device (not represented) that can be actuated by the driver, following a corresponding informing or warning signal.

For example, when the vehicle 1 is in motion, an appropriate sensor can determine that the ambient light is too low and trigger the activation of the IR light source(s) 37.

According to another example, when the vehicle 1 is stopped, an appropriate sensor may detect that the side aperture of the trailer 11 is open, meaning that the vehicle 1 is in the loading/unloading configuration. Consequently, the light source(s) 36 of the working lamp 35 may be activated.

The concepts disclosure herein therefore provide an interesting solution in terms of cost, compactness and modularity, insofar as one and the same lighting device can provide the appropriate function among several lighting, illuminating or signaling functions.

Of course, the present disclosure is not limited to the embodiments described above by way of examples but it comprises all technical equivalents and variants of the described means as well as the combinations thereof.

What is claimed is:

1. A vehicle comprising:
a chassis which has a longitudinal axis and which is supported by wheels;
a cab mounted on the chassis, the cab including two side walls;
a wind deflecting assembly comprising at least two side deflector panels, each side deflector panel having a front edge linked to a rear portion of the corresponding side wall of the cab and a rear edge, and extending vertically over at least part of the height of the rear portion of the corresponding side wall of the cab;
a camera monitoring system, which includes a camera arranged on a supporting arm mounted on the cab, to provide a captured image of an area located rearward of the cab;

wherein the vehicle further comprises at least one lighting device which is mounted on a side deflector panel and which includes at least one IR emitting light source.

2. The vehicle of claim 1, wherein the lighting device extends over a height which is at least equal to half the height of the side deflector panel, preferably substantially identical to the height of the side deflector panel.

3. The vehicle of claim 1, wherein the lighting device includes an area including several IR emitting light sources, the area extending over a height which is at least equal to half the height of the side deflector panel.

4. The vehicle of claim 1, wherein each side deflector panel has an inner face, disposed towards the longitudinal axis of the chassis, and an outer face, and wherein the lighting device is mounted on the inner face of the side deflector panel.

5. The vehicle of claim 1, wherein the lighting device is mounted near the rear edge of the side deflector panel.

6. The vehicle of claim 1, wherein the lighting device is configured and mounted on the side deflector panel such that, when the side deflector panel is in a position in which the outer face thereof is substantially in the extension of the corresponding side wall of the cab, the at least one IR emitting light source can emit a light beam substantially along a corresponding side wall of the chassis.

7. The vehicle of claim 1, wherein the lighting device is configured and mounted on the side deflector panel such that, when the side deflector panel is in a position in which the outer face thereof is substantially in the extension of the corresponding side wall of the cab, a main optical axis of the at least one IR emitting light source, when projected on a horizontal plane, is angled relative to the longitudinal axis of the chassis by an angle which is comprised between −10° and +10°.

8. The vehicle of claim 1, wherein the lighting device further includes at least one working lamp configured to illuminate an area located rearward of the cab.

9. The vehicle of claim 1, wherein the lighting device further includes at least one light source configured to project an image rearward of the cab, the image forming a mark on a functional face located rearward of the cab, the mark being detectable by the camera.

10. A method for controlling a lighting device in a vehicle, wherein the vehicle comprises:
 a chassis which has a longitudinal axis and which is supported by wheels;
 a cab mounted on the chassis, the cab including two side walls;
 a wind deflecting assembly comprising at least two side deflector panels, each side deflector panel having a front edge linked to a rear portion of the corresponding side wall of the cab and a rear edge, and extending vertically over at least part of the height of the rear portion of the corresponding side wall of the cab; and
 a camera monitoring system, which includes a camera arranged on a supporting arm mounted on the cab, to provide a captured image of an area located rearward of the cab;
wherein the vehicle further comprises at least one lighting device which is mounted on a side deflector panel and which includes at least one IR emitting light source;
wherein the lighting device includes, in addition to at least one IR emitting light source, at least one additional light source among a working lamp and light source(s) used to form a mark which is detectable by a camera on a functional face located rearward of the cab, the method comprising the steps of:
 determining at least one selection parameter among:
  a configuration of the vehicle;
  an operating condition of the vehicle; and
  a surrounding condition;
 depending on the determined selection parameter, activating automatically or through manual control at least one among the IR emitting light source(s) and the at least one additional light source.

\* \* \* \* \*